(12) United States Patent
Chen et al.

(10) Patent No.: US 9,077,720 B2
(45) Date of Patent: *Jul. 7, 2015

(54) ARCHITECTURE FOR OPEN COMMUNICATION IN A HETEROGENEOUS NETWORK

(71) Applicants: Telcordia Technologies, Inc., Piscataway, NJ (US); Toyota Info Technology Center, U.S.A., Inc., Mountain View, CA (US)

(72) Inventors: Wai Chen, Basking Ridge, NJ (US); John Lee, Howell, NJ (US); Ratul Guha, Kendall Park, NJ (US); Yibei Ling, Belle Mead, NJ (US); Taek-Jin Kwon, Morganville, NJ (US); Rama Vuyyuru, Somerset, NJ (US); Junichiro Fukuyama, Union, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/152,185

(22) Filed: Jan. 10, 2014

(65) Prior Publication Data

US 2014/0133402 A1 May 15, 2014

Related U.S. Application Data

(63) Continuation of application No. 13/085,967, filed on Apr. 13, 2011, now Pat. No. 8,665,789.

(51) Int. Cl.
*H04L 12/28* (2006.01)
*H04L 29/12* (2006.01)
*H04W 40/20* (2009.01)
*H04L 12/56* (2006.01)
*H04L 12/725* (2013.01)

(52) U.S. Cl.
CPC .............. *H04L 61/10* (2013.01); *H04L 45/306* (2013.01); *H04W 40/20* (2013.01); *H04L 45/741* (2013.01)

(58) Field of Classification Search
None
See application file for complete search history.

(56) References Cited

U.S. PATENT DOCUMENTS 6,791,981 B1  9/2004 Novaes
6,981,055 B1  12/2005 Ahuja et al.
(Continued)

OTHER PUBLICATIONS

International Application No. PCT/US2012/032286—PCT International Search Report dated May 23, 2012.

*Primary Examiner* — Gregory Sefcheck
*Assistant Examiner* — Daniel Mitchell (57) ABSTRACT

Network architecture configured for open communication between a plurality of sub-networks. Each of the plurality of sub-networks has a different routable network addressing scheme. The architecture includes at least one broker node adapted to communicate using at least two different routable network addressing schemes. The broker node comprises an identification management module configured to collect peer-application addresses for nodes currently accessing a specific application, the peer-application addresses being associated with a specific application, an address resolution module configured to map each of the peer-application addresses to a sub-network specific routable network address and a network coordination module configured to monitor and coordinate sub-network communication capabilities between the broker node and at least one other broker node and elect a primary broker node for each sub-network which the broker node and at least one other broker node is capable of communication.

11 Claims, 6 Drawing Sheets

(56) References Cited

U.S. PATENT DOCUMENTS

| | | |
|---|---|---|
| 7,768,913 B1 * | 8/2010 | Shepherd et al. ............ 370/230 |
| 7,848,278 B2 | 12/2010 | Chen et al. |
| 8,422,460 B2 | 4/2013 | Jain et al. |
| 2002/0169846 A1 | 11/2002 | Chen et al. |
| 2003/0223457 A1 | 12/2003 | Cyr et al. |
| 2004/0034695 A1 | 2/2004 | Touch et al. |
| 2006/0248202 A1 | 11/2006 | Blanchet et al. |
| 2007/0109976 A1 | 5/2007 | Samanta et al. |
| 2008/0137638 A1 * | 6/2008 | Chun ............................ 370/351 |
| 2008/0247399 A1 | 10/2008 | Hazard |
| 2008/0256553 A1 | 10/2008 | Cullen |
| 2008/0291849 A1 | 11/2008 | Ostermeier et al. |
| 2009/0209233 A1 | 8/2009 | Morrison |
| 2012/0209901 A1 | 8/2012 | Xu et al. |

* cited by examiner

ARCHITECTURE FOR OPEN COMMUNICATION IN A HETEROGENEOUS NETWORK

FIELD OF THE INVENTION

This invention relates to architecture which supports open communication between moving vehicles and road-side units or infrastructure where the different vehicles and road-side units may be configured for communication in different sub-networks. This application is a continuation of pending U.S. patent application Ser. No. 13/085,967, filed Apr. 13, 2011.

BACKGROUND OF THE INVENTION

Wireless communication has become common in all aspects of life today, whether it be a wireless home or office network, so-called "hotspot" networks at local cafes, fast food chains or hotels, or even citywide implementations of WiFi technologies. This desire to become a society of wireless communication has even extended to moving devices such as a moving vehicle with the use of mobile networks. This type of wireless networking may appear in many aspects of vehicle safety applications, including, but not limited to, urgent road obstacle warning, intersection coordination, hidden driveway warning, lane-change or merging assistance. In the mobile networks, different sub-networks are used for communication and grouping vehicles and road-side units (RSUs) such as geographic based sub-networks or peer-group based sub-networks. An local peer group network is described in U.S. Pat. No. 7,848,278 issued Dec. 7, 2010 and assigned to Telcordia Technologies, Inc., et al ("Telcordia Tech"), the contents of which is incorporated herein by reference.

However, with the use of different sub-networks, vehicles and RSUs configured to communicate in one sub-network cannot communicate with vehicles and RSUs in another sub-network. This is because of the incompatibilities among the different sub-networks such as naming, addressing routing and radio technologies. For example, a geo-based source vehicle cannot send a traffic update message to a LPG-based vehicle.

SUMMARY OF THE INVENTION

Accordingly, disclosed is a mobile communication network configured for open communication between at least two sub-networks. Each sub-network has a different routable network addressing scheme. The network comprises a plurality of nodes configured for communicating using a first sub-network of the at least two sub-networks via a corresponding routable network addressing scheme, a plurality of nodes configured for communicating using a second sub-network of the at least two sub-networks via a corresponding routable network addressing scheme; and at least one broker node configured for communicating using at least two of the at least two sub-networks via the corresponding routable network addressing schemes for each of the sub-networks. The at least one broker node receives a message from one node of the plurality of nodes of the first sub-network of the at least two sub-network and forwards the message to at least one node in a second sub-network of the at least two-sub-networks based at least upon an application in which the message is created.

Each broker node broadcasts its status of a broker node to each sub-network that the broker is configured to communicate. The broadcast is via a broadcast routable address corresponding to each sub-network.

Each broker node maintains a coordinated list of broker nodes and their corresponding sub-network communication capabilities using information from the broadcast.

Each of the plurality of nodes configured for communicating using the first or second sub-networks receives the broadcast and maintains a list of broker nodes.

The application can be an emergency service message. If the application is an emergency service message, each broker node broadcasts the message to each of at least two sub-networks using the broadcast routable address corresponding to each of the at least two sub-networks.

Alternatively, the application can be a traffic alert message. If the application is a traffic alert message, each broker node broadcasts the message to each of the at least two sub-networks using the broadcast routable address corresponding to each of the sub-networks and forwards the message to another broker node to distribute the message to other sub-networks that the broker node is not configured for communication. Another broker node is determined based upon the coordinated list of broker nodes.

Alternatively, the broker node broadcasts the message to each of the at least two sub-networks using the broadcast routable address corresponding to each of the sub-networks, determines if there is a need to forward the message to another of the at least one broker nodes based upon a location of a source node and forwards the message to another of the at least one broker nodes to distribute the message to other sub-networks that the at least one broker node is not configured for communication. Another broker node is determined based upon the coordinated list of broker nodes and the determined need to forward the message.

Alternatively, the application generates an unicast packet for an unicast message. The unicast packet can have multiple destination points.

Each broker node receives update messages from each of the plurality of nodes configured for communicating using the first or second sub-networks. The update message includes all pending applications running at each node and a corresponding peer-application address for the application, sub-network specific routable network address. Each broker node stores a pending application identifier, corresponding peer-application address, peer-application address and sub-network specific routable network address for each node. The pending application identifier and corresponding peer-application address is associated with each other and the peer-application address and the sub-network specific routable network address is associated with each other.

One node of either of the plurality of nodes configured for communicating using the first or second sub-networks broadcasts a request for a list of peer-application addresses for nodes currently accessing an application. Each broker node responds to the request with a list of peer-application addresses corresponding to the requested application.

A node transmits an unicast packet having the peer-application address as an application destination and a routable address for a broker node that responded to the request with the peer-application address in a network header and has a message in a payload.

The broker node that responded to the request with the peer-application address receives the unicast packet and replaces its routable address with a sub-network specific routable network address that corresponds to the peer-application address in the unicast packet in the network header and Also disclosed is a broker node configured for open communication between a plurality of sub-networks. Each of the plurality of sub-networks has a different routable network addressing scheme. The broker node comprises an identification management module configured to collect peer-application addresses for nodes currently accessing a specific application, the peer-application addresses being associated with a specific application, an address resolution module configured to map each of the peer-application addresses to a sub-network specific routable network address; and a network coordination module configured to monitor and coordinate sub-network communication capabilities between the broker node and at least one other broker node and elect a primary broker node for each sub-network which the broker node and at least one other broker node is capable of communication.

The network coordination module is configured to generate a broadcast message advertising the broker node's status as a broker node to each sub-network that the broker is configured to communicate. The broadcast is via a broadcast routable address corresponding to each sub-network.

The network coordination module is configured with a broadcast mutable address corresponding to each of the sub-networks. The broadcast routable address is used when a message is received for a broadcast application.

A broadcast application can be, but is not limited to, an emergency service message or a traffic alert message.

The routable network addressing scheme for a first of the plurality of networks can be geographic based and routable network addressing scheme for a second of the plurality of networks can be group based.

Alternatively, the routable network addressing scheme for a first of the plurality of networks can be geographic based and the routable network addressing scheme for a second of the plurality of networks can be Internet Protocol (IP) based.

The broker node can be, but is not limited to, a moving vehicle or roadside unit.

BRIEF DESCRIPTION OF THE DRAWINGS

These and other features, benefits, and advantages of the present invention will become apparent by reference to the following figures, with like reference numbers referring to like structures across the views, wherein.

DETAILED DESCRIPTION OF THE INVENTION

Definitions

A "Node" is a router that implements the channel determination and selection process or method as specified in the following description. For example, a moving vehicle having a communication device is a node.

A "multicast message" is a message with greater or equal to one destination. For the purposes of the detailed description a multicast message is referenced as a multicast packet (MP).

A "hop" is a number of nodes in which a message is relayed.

A "hop count" between two nodes, i.e., source to a destination, is equal to the number of relay nodes plus 1.

Figure 1:
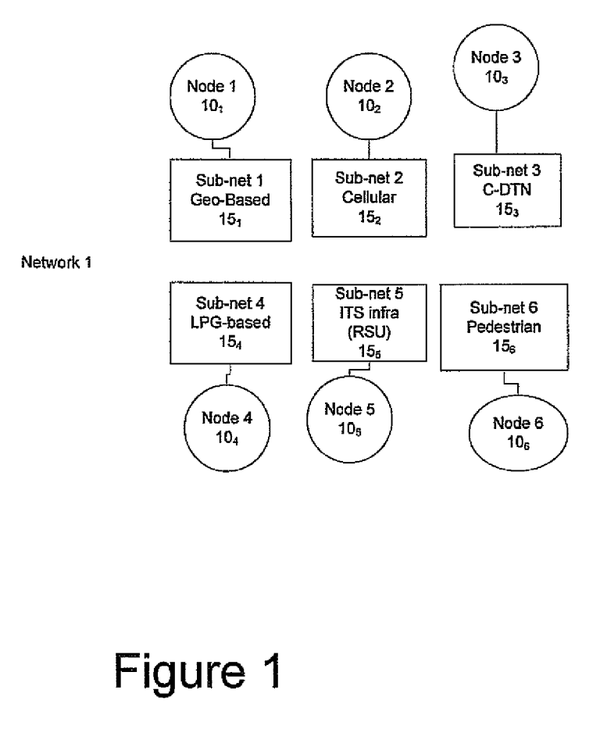
FIG. 1 illustrates an exemplary network having multiple sub-networks.

A network can consist of multiple sub-networks (generally references as "15"). FIG. 1 illustrates an example of a network 1 having a plurality of sub-networks 15. As depicted in FIG. 1 there are six different sub-networks, e.g., sub-net 1-subnet 6($15_1$-$15_6$). A sub-network 15 is a connected set of nodes with a common addressing scheme. Additionally, each sub-network 15 has its own technologies and policies, including but not limited to, naming, addressing routing and radio technologies. For example, the address routing ("routable address") for a geo-based sub-network is defined by a location. The routable address for an IP-based sub-network is number IP addresses (class A, B, C, D, E IP addresses). The routable address for a cellular-based sub-network can be a cellular phone number. The routable address for a LPG-based sub-network can be a zip code or a vehicle identifier for a LPG group header node. RSUs or other infrastructure can have a routable address using multiple methods such as, but not limited to, IP addressing, location, etc. Node 10 can be either moving vehicles or road-side units. Additionally, a pedestrian with a wireless communication device can be a node 10. Nodes 10 typically can only communicate using the routable address and protocols for one of the sub-networks. For example, Node 1 $10_1$ communicates using sub-net 1 Geo-based $15_1$. Typically, a node 10 is configured with the protocol(s) for one communication network, i.e., one network layer. Without open communication, nodes 1-6 $10_{1-6}$ cannot communicate with each other.

Figure 2:
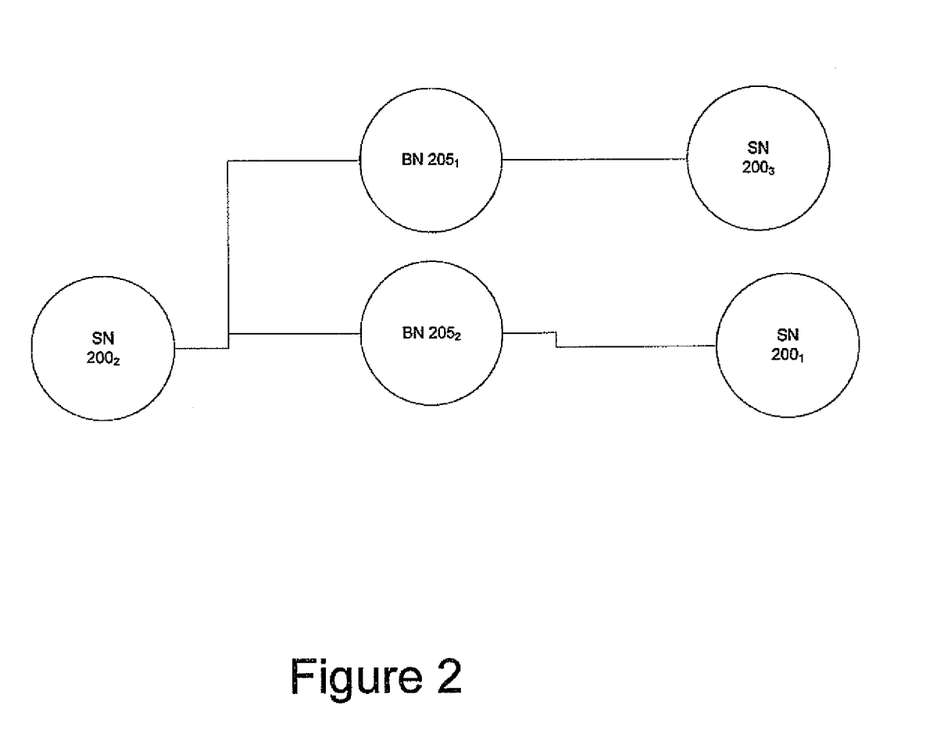
FIG. 2 illustrates an exemplary open communication network between heterogeneous nodes in accordance with the invention.

However, using an open communication network, different user-platforms, e.g., sub-networks 15 are dynamically coordinated into one virtual network. FIG. 2 illustrates a block diagram of an open communication network 2 according to the invention. Nodes 10 in the open communication network 2 are divided into two types of nodes: simple nodes (SNs) 200 and broker nodes (BNs) 205.

A SN 200 is configured to communicate using one sub-network 15, e.g., apriori configured with the protocol of one sub-network 15. A SN 200 can handle only one addressing scheme, e.g., IP. A BN 205 enables message exchange between different sub-networks and dynamically coordinate different user platforms without apriori configurations of all of the nodes addresses in the sub-networks 15. A BN 205 is configured with at least two different sub-network protocols, e.g., at least two network layer protocols. Accordingly, BN 205 supports different address schemes, different routing protocols and different naming. For example, a BN 205 can support any and all of sub-net 1-subnet 6($15_1$-$15_6$). Any number of BNs 205 can be used in the open communication network 2 where each BN can have different sub-network capabilities.

The BNs 205 effectively act as a coordination plane between the SNs 200, e.g., a sub-network plane (individual sub-networks) and an application message plane (applications). The functions of the BNs 205 are application specific. For example, the functionality of a BN 205 for a safety related messages (e.g., broadcast-type of message dissemination) is different than the functionality for a unicast message (point to point or point to multi-points). The functionality for both will be described in detail later. The coordination plane and BN 205 encompass multiple protocol layers, i.e., radio, link, network, and application.

A BN 205 actively disseminates or advertises its status as a BN. Additionally, a SN 200 can actively seek a BN 205.

Figure 3:
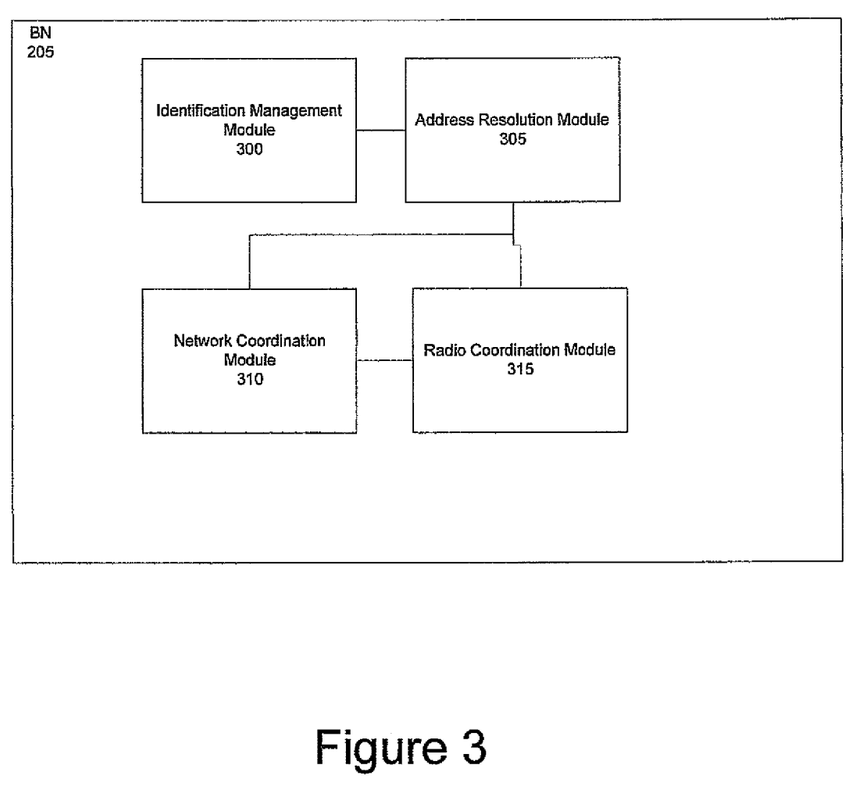
FIG. 3 is a block diagram of a broker node in accordance with the invention.

FIG. 3 illustrates a modular block diagram of an exemplary BN 205 in accordance with the invention. The BN 205 has four modules: an identification management module 300 (hereinafter "IMM"), an address resolution module 305 (hereinafter "ARM"), a network coordination module 310 (hereinafter "NCM") and a radio coordination module 315 (hereinafter "RCM"). The BN 205 manages identifications for SNs 200 in the heterogeneous network environment, i.e., identification management module 300, translates the identifications for the SNs 200 into sub-network specific routable addresses, i.e., address resolution module 305 and routes and forwards the messages to the sub-network, i.e., network coordination module 310 and selects a particular radio interface (when multiple radio interfaces are associated with the sub-network) for forwarding the messages, i.e., radio coordination module 315.

Figure 4:
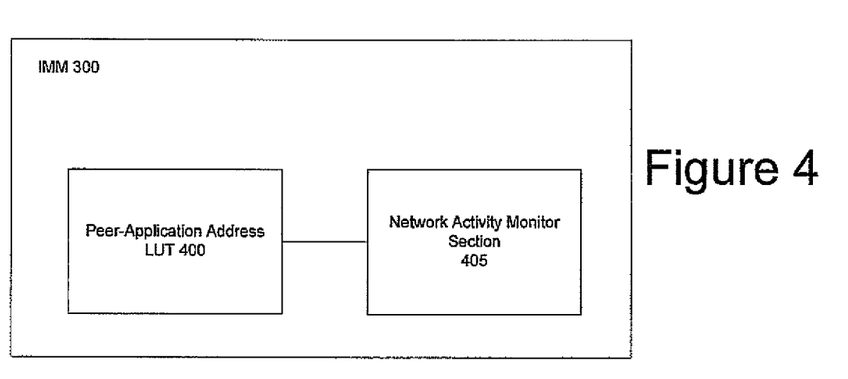
FIG. 4 is a block diagram of an identification management module of a broker node in accordance with the invention.

FIG. 4 illustrates a block diagram of an IMM 300 according to the invention. The IMM 300 includes a peer-application address Look-up table (LUT) 400 and a network activity monitoring section 405. A peer-application address is universal in the open network 2 and is not sub-network specific. A peer-application address is unique identifier for a SN 200 for a given application. The address is application specific. Additionally, a network application has a unique application identifier. The peer-application address LUT 400 includes a mapping for the unique application identifiers and the peer-application address for any application that a given SN 200 is currently executing. The network activity monitoring section 405 continuously monitors the application activity for SN 200s within its sub-network capability. This is achieved using the sub-network specific messaging protocol. Each sub-network 15 has its own protocols for managing and maintaining the network. The BN 205, using the network activity monitoring section 405, can overhear this information and extract the needed application identifiers and peer-application address for the current applications running at each SN 200.

For example, in an LPG-based sub-network, i.e., sub-net 4 15$_4$, the activity information can be obtained from a heartbeat control packet or membership reports, unicast and multicast session information etc. as described in U.S. Pat. No. 7,848, 278 issued Dec. 7, 2010 and assigned to Telcordia Tech., the contents of which is incorporated herein by reference.

The IMM 300 is not used for applications that require a broadcast message, such as, but not limited to, safety application messages and local traffic alerts. However, the IMM 300 is used for applications that require an on-demand unicast, point to point or multipoint message, such as, but not limited to software and map updates and multi-cast applications.

Figure 5:
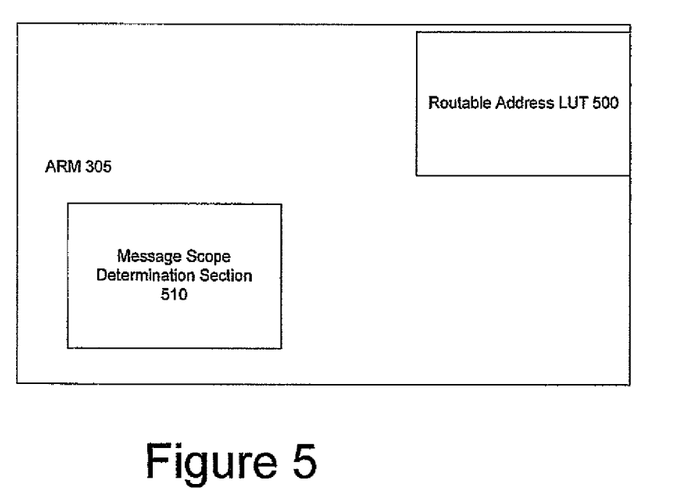
FIG. 5 is a block diagram of an address resolution module of a broker node in accordance with the invention.

FIG. 5 illustrates a block diagram of the ARM 305 according to the invention. The ARM 305 includes a routable address LUT 500 and a message scope determination section 510. The routable address LUT 500 contains a mapping between the peer-application address in the Peer-application address LUT 400 and a sub-network specific routable address. The sub-network routable address can be the actual sub-network address of the destination node or an address of the next hop to destination node. The next hop to destination node is determined by the local routing table 630 which will be described later in detail. The routing information is based upon the sub-network specific routing protocols. For example, in an LPG-based sub-network, i.e., sub-net 4 15$_4$, the sub-network specific mutable address can be obtained from a heartbeat control packet or membership reports, unicast and multicast session information etc. as described in. U.S. Pat. No. 7,848,278 issued Dec. 7, 2010 and assigned to Telcordia Tech., the contents of which is incorporated herein by reference.

The ARM 305 effectively converts a peer-application address from an application layer in an incoming message into a sub-network specific routable address that can be used by the sub-network specific routing protocol in the BN 205, i.e., NCM 310 and RCM 315.

The message scope determination section 510 determines whether an incoming message needs to be forwarded to another sub-network based upon a message scope. The message scope can be application specific. For example, a safety application message can be routed to all heterogeneous sub-networks. Alternatively, the location of the source of the safety application message and the location of the BN 205 can be used to limit the forwarding of the safety application message. A traffic alert message can be limited to a specific location. However, a unicast, (point to point or multi-point) message might be routed to a sub-network based upon number of hops, current hop count and location. The incoming packet can include a location of the source, a time to live value for the packet (maximum hop count) and a relevant location scope.

The ARM 305 is not used for applications that require a broadcast message, such as, but not limited to, safety application messages and local traffic alerts. However, the ARM 305 is used for applications that require an on-demand unicast, (point to point or multi-point) message, such as, but not limited to software and map updates and multi-cast applications.

Figure 6:
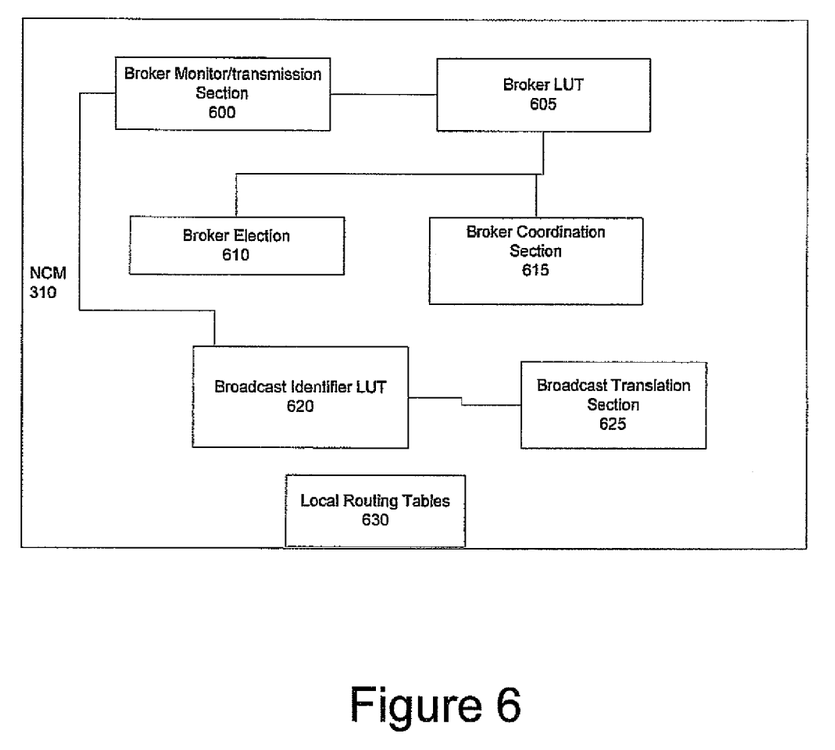
FIG. 6 is a block diagram of a network coordination module of a broker node in accordance with the invention.

FIG. 6 illustrates a block diagram of the NCM 310. The NCM 310 is used for coordination of BN activities between multiple BNs 205. The NCM 310 interacts with the ARM 305 and the RCM 315.

The NCM 310 includes a broker monitor and transmission section 600, a broker LUT, a broker election section 610 and broker coordination section 615. BN advertisements are used by the BNs 205 to inform both other BNs 205 and SN 200 in the open network 2 of available BN. The advertisements are used to track BNs and their capabilities.

The broker monitor and transmission section 600 broadcasts a BN advertisement. The BN advertisement includes a BN identifier, a sub-network specific routable address and a status identifier. The status identifier indicates that the node is a BN 205. The BN advertisement is broadcast to each sub-network that the BN 205 is capable of communication, i.e., each sub-network that the BN is configured with a protocol for. For example, if the BN 205 has a protocol for LPG-based address schemes and routing, IP based address schemes and routing and geographical based address schemes and routing, then the BN 205 will broadcast three separate BN advertisements. The first BN advertisement will include an LPG-based routable address for the BN, a LPG based name and a BN status identifier. The second BN advertisement will include an IP routable address for the BN, an IP based name and a BN status identifier. The third BN advertisement will include a geographical based routable address for the BN, a geographical based name and a BN status identifier.

The BN advertisement is broadcast using a broadcast routable address specific to the sub-network. Each sub-network has a dedicated mutable address for broadcasting. The dedicated routable address for broadcasting for each of the sub-networks which a BN is capable of communicating in is a priori known and stored in a broadcast identifier LUT 620. The broadcast identifier LUT 620 has an entry of broadcast routable addresses for each sub-network which a BN is capable of communicating. The broadcast routable address is associated with the appropriate sub-network. For example, for an IP-based sub-network, x.y.z.255 can be used. For an LPG-based sub-network, an LPG-ID plus a broadcast specific field such as, but not limited to, "0000" can be used. For a geo-based sub-network, geographical coordinates representing a destination area (broadcast region) instead of a specific coordinate for a destination point can be used.

The broker LUT 605 includes an entry for each BN 205 in the open communication network 2 (including an entry for itself). The entry contains the name of the BN and the sub-network capabilities (and corresponding sub-network specific routable address). The name of the other BNs and corresponding capabilities is determined based upon receipt of the BN advertisement from the other BNs. The broker monitor/transmission section 600 receives the BN advertisements from the other BNs and extracts the name, routable address and sub-network type and adds this information into the broker LUT 605. If a BN advertisement is not received from a BN listed in the broker LUT 605, the entry is purged after a predetermined time. The predetermined time can be a function of a BN advertisement cycle period. The BN advertisement cycle period is the time between two successive BN advertisements.

The broker LUT 605 is used by the broker election section 610 and broker coordination section 615 to elect and coordinate BN activities between multiple BNs. A BN can be selected to elected based on, but not limited to, network capabilities, mobility behavior, and their current location. For example, a node with access to a specific location can be elected as a BN to send traffic updates to the specific location.

Depending on the network application message, the broker coordination section 615 will aggregate the forwarding of the message with multiple BNs to ensure that the message is forwarded to all available sub-networks. For example, BN1 is capable of communicating in sub-networks 1-3 and BN2 is capable in communicating in sub-networks 3-5, BN1 and BN2 will combine their activities to forward the message to sub-networks 1-5. If a traffic alert message is received by BN1, BN1 will forward the message to sub-networks 1-3 and forward the message to BN2 to cover sub-networks 3-5. The message will be broadcast using the broadcast routable addresses for each sub-network in the broadcast identifier LUT 620 using the broadcast translation section 625. The broadcast translation section 625 is used for applications requiring broadcast messages such as, but not limited to, safety application messages and traffic alert messages. The broadcast identifier LUT 620 and broadcast translation section is not used for unicast, (point to point or multi-point) and multicast application messages.

Local routing table(s) 630 is used to tracking SNs 200 local to the BNs. 205. A SN 200 is local to a BN 205 if the node is in a sub-network which the BN 205 is capable of communication and within N-number of hops of the BN 205. Each local routing table is generated using a corresponding sub-network routing protocol. For example, in an LPG-based sub-network, i.e., sub-net 4 15$_4$, the local routing table 630 is generated from a heartbeat control packet or membership reports, unicast, (point to point or multi-point) and multicast session information etc. as described in U.S. Pat. No. 7,848, 278 issued Dec. 7, 2010 and assigned to Telcordia Tech., the contents of which is incorporated herein by reference.

A data packet (application message) contains a header and content section. The header can include an application identifier and a peer-application address. In the case of heterogeneous forwarding, the sub-network specific routable address is for the BN and not that actual end destination. An application layer of the source node generated the application packet with the application identifier and peer-application address. The network layer adds the sub-network specific routable address. Additionally, the application layer can add an application scope for the application message.

SN 200 includes a broker LUT. The broker LUT is similar to the broker LUT 605 in the BN 205 as will not be described again in detail. For unicast, (point to point or multi-point) applications, the broker LUT can be used by the SN 200 to obtain a list of available destinations for a given network application. The SN 200 can transmit a request for all peer-application addresses for a given network application to each of the BNs 205 in the LUT. Alternatively, the 200 can broadcast the same request. Any BNs 205 in the open communication network can respond with a list of peer-application addresses for the requested network application.

Upon receipt of the request, the IMM 300 will respond to the request with a list using the peer-application address LUT 400. The request will include the application identifier for the requested application. The IMM 300 will retrieve the peer-application address LUT 400 and read out a list of corresponding peer-application addresses. The BN 205 will transmit a response to the SN 200. The response will include the list of peer-application addresses and a network specific routable address for the BN.

The application layer at the SN will then generate a unicast, (point to point or multi-point) application message and append the peer-application address(es) for the desired destination(s) into the header along with the application identifier and the content. The network layer for the SN will add the network specific routable address for the BN.

When the BN 205 receives the unicast, (point to point or multi-point) application message, the ARM 305 will translate the peer-application address(es) into a network specific routable address(es) for the destination(s) using the routable address LUT 500. The translation will be performed in conjunction with the local route table 630 in the NCM 310. Once the address(es) is/are translated, network specific routable address(es) for the destination(s) is/are replaced in the route for the unicast, (point to point or multi-point) application message, i.e., next hop to destination.

Additionally, the BN 205 can determine if the unicast, (point to point or multi-point) application message should be forwarded using the message scope determination section 510 in the ARM 305, i.e., check the message scope.

For a broadcast application message, such as, but not limited to safety application messages and traffic alert messages, the BN LUT is not needed. The SN 200 uses the sub-network broadcast address. The BN 205 receives the message and broadcasts the message to all of the sub-networks that the BN 205 is capable of communicating in. Depending on the application, the 13N 205 might coordinate with other BNs to broadcast the application message.

Figure 7:
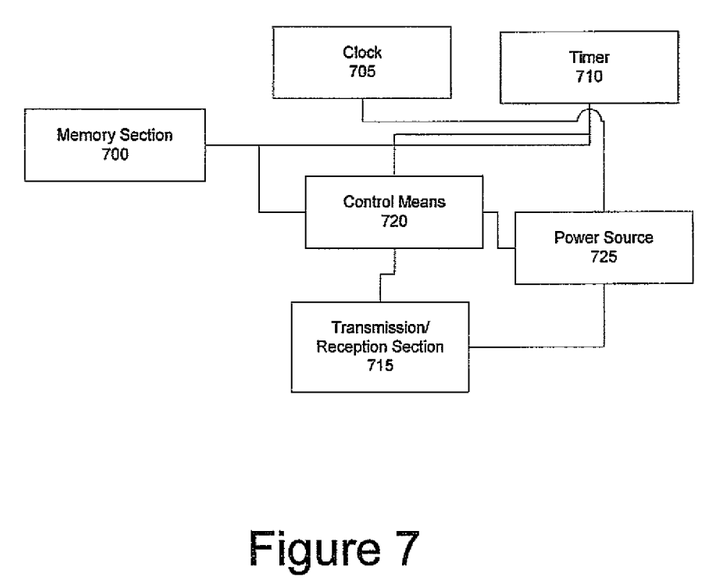
FIG. 7 illustrates a block diagram of basic elements of the node adapted for communicating in a network according to the invention.

FIG. 7 illustrates a block diagram of basic elements of the node. The node includes a memory section 700, a clock 705, a timer 710, a transmission/reception section 715, a control means 720 and a power source 725. The memory section 700 can be any type of memory including DRAM, SRAM or Flash. In a preferred embodiment, the short-term memory is cache. The memory section 700 stored the program for causing the control means 720 to execute the functionality of the modules described herein.

The clock 705 is used to maintain the timing for the node. Specifically, the clock 705 functions as an internal clock and is used as a basis for setting a timer 710. The timer 710 is used to determine when to broadcast the various messages. The control means 720, e.g., microprocessor controls all of the processes of the node including generation of the message, routing, timer and executes the functionality of the modules described herein. Additionally, the control means 720 is also responsible for header resolution, which will be described later in detail. The transmission and reception section 705 in combination with the control means 720 is responsible for creating or generating the message from data, which is stored in the memory section 700.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as "modules" or "system."

Various aspects of the present invention may be embodied as a program, software, or computer instructions embodied in a computer or machine usable or readable storage device, which causes the computer or machine to perform the functionality of the modules and disclosed herein when executed on the computer, processor, and/or machine. A program storage device readable by a machine, tangibly embodying a program of instructions executable by the machine to perform various functionalities and methods described in the present disclosure is also provided.

The system and functionality of the present invention may be implemented and run on a general-purpose computer or special-purpose computer system. The computer system may be any type of known or will be known systems.

The above description provides illustrative examples and it should not be construed that the present invention is limited to these particular example. Thus, various changes and modifications may be effected by one skilled in the art without departing from the spirit or scope of the invention as defined in the appended claims.

What is claimed is:

1. A mobile communication network configured for open communication between at least two sub-networks, where each of the at least one sub-networks has a different routable network addressing scheme, comprising:
a plurality of nodes configured for communicating using a first sub-network of the at least two sub-networks via a corresponding routable network addressing scheme;
a plurality of nodes configured for communicating using a second sub-network of the at least two sub-networks via a corresponding routable network addressing scheme; and
at least one broker node configured for communicating using at least two of the at least two sub-network via the corresponding routable network addressing schemes for each of the sub-networks, wherein the at least one broker node receives a traffic alert message from one node of the plurality of nodes of the first sub-network of the at least two sub-network and forwards the traffic alert message to at least one node in a second sub-network of the at least two-sub-networks based at least upon a traffic alert application in which the message is created;
wherein each of the at least one broker nodes maintains a coordinated list of broker nodes and their corresponding sub-network communication capabilities;
wherein the at least one broker node:
broadcasts the traffic alert message to each of the at least two sub-networks using the broadcast routable address corresponding to each of the sub-networks:
forwards the traffic alert message to another of the at least one broker node to distribute the traffic alert message to other sub-networks that the at least one broker node is not configured for communication; and
determines the other broker node based upon the coordinated list of broker nodes.

2. The mobile communication network according to claim 1, wherein each of the at least one broker nodes broadcasts its status of a broker node to each sub-network that the at least one broker is configured to communicate, the broadcast being via a broadcast routable address corresponding to each sub-network.

3. The mobile communication network according to claim 1, wherein each of the plurality of nodes configured for communicating using the first or second sub-networks receives the broadcast and maintains a list of broker nodes.

4. The mobile communication network according to claim 3, wherein the traffic alert application generates a unicast packet for a unicast message.

5. A broker node configured for open communication between a plurality of sub-networks, where each of the plurality of sub-networks has a different routable network addressing scheme, the broker node comprising:
an identification management module that collects peer-application addresses for nodes currently accessing a traffic alert application, the peer-application addresses being associated with the traffic alert application;
an address resolution module configured to map each of the peer-application addresses to a sub-network specific routable network address;
a network coordination module configured to monitor and coordinate sub-network communication capabilities between the broker node and at least one other broker node and elect a primary broker node for each sub-network which the broker node and at least one other broker node is capable of communications;
a receiving interface that receives a traffic alert message for the traffic alert application; and
a broadcast interface that broadcasts the traffic alert message to each of the plurality of sub-networks using the sub-network specific routable network address corresponding to each of the sub-networks;
wherein each of the at least one broker nodes maintains a coordinated list of broker nodes and their corresponding sub-network communication capabilities using information from the broadcast;
wherein the broker node:
forwards the traffic alert message to another of the at least one other broker node to distribute the traffic alert message to other sub-networks that the at least one broker node is not configured for communication; and
determines the other broker node based upon a coordinated list of broker nodes.

6. The broker node according to claim 5, wherein the network coordination module is configured to generate a broadcast message advertising the broker node's status as a broker node to each sub-network that the broker is configured to communicate, the broadcast being via a broadcast routable address corresponding to each sub-network.

7. The broker node according to claim 6, wherein the network coordination module is configured with a broadcast routable address corresponding to each of the sub-networks, the broadcast routable address is used when the traffic alert message is received for the traffic alert application.

8. The broker node according to claim 6, wherein a routable network addressing scheme for a first of the plurality of networks is geographic based and routable network addressing scheme for a second of the plurality of networks is group based.

9. The broker node according to claim 6, wherein a routable network addressing scheme for a first of the plurality of networks is geographic based and mutable network addressing scheme for a second of the plurality of networks is Internet Protocol (IP) based.

10. The broker node according to claim 6, wherein the broker node is a moving vehicle 11. The broker node according to claim 6, wherein the broker node is a roadside unit.

\* \* \* \* \*

UNITED STATES PATENT AND TRADEMARK OFFICE
CERTIFICATE OF CORRECTION

PATENT NO. : 9,077,720 B2  
APPLICATION NO. : 14/152185  
DATED : July 7, 2015  
INVENTOR(S) : Chen et al.

Page 1 of 2

It is certified that error appears in the above-identified patent and that said Letters Patent is hereby corrected as shown below:

Title page, item (73), under "Assignee", in Column 1, Line 2, delete "NJ (US)" and insert -- NJ (US); Toyota Info Technology Center, U.S.A., Inc., Mountain View, CA (US) --, therefor.

Specification

In Column 1, Line 12, delete "2011." and insert -- 2011, now Pat. No. 8,665,789. --, therefor.

In Column 2, Line 63, delete "and" and insert -- and forwards the unicast packet to the application destination. --, therefor.

In Column 3, Line 19, delete "mutable" and insert -- routable --, therefor.

In Column 5, Line 65, delete "mutable" and insert -- routable --, therefor.

In Column 5, Line 67, delete "in." and insert -- in --, therefor.

In Column 6, Line 61, delete "mutable" and insert -- routable --, therefor.

In Column 7, Line 51, delete "BNs." and insert -- BNs --, therefor.

In Column 8, Line 12, delete "200" and insert -- SN 200 --, therefor.

In Column 8, Line 51, delete "13N" and insert -- BN --, therefor.

In Column 9, Line 4, delete "section 705" and insert -- section 715 --, therefor.

Claims

In Column 9, Line 65, in Claim 1, delete "sub-networks:" and insert -- sub-networks; --, therefor.

Signed and Sealed this  
First Day of December, 2015

Michelle K. Lee  
*Director of the United States Patent and Trademark Office*

Claims

In Column 10, Line 35, in Claim 5, delete "communications;" and insert -- communication; --, therefor.

In Column 11, Line 6, in Claim 9, delete "mutable" and insert -- routable --, therefor.

In Column 11, Line 10, in Claim 10, delete "vehicle" and insert -- vehicle. --, therefor.